United States Patent [19]
Terpening et al.

[11] Patent Number: 6,044,158
[45] Date of Patent: Mar. 28, 2000

[54] METHOD AND APPARATUS FOR COMMUNICATING SECURE DATA OVER A TELEPHONE LINE USING A CELLULAR ENCRYPTION APPARATUS

[75] Inventors: Lynn Eric Terpening, Mesa; Kenneth Nicholas Kuczyk; Daniel Neil Kuczyk, both of Scottsdale, all of Ariz.

[73] Assignee: Motorola, Inc., Schaumburg, Ill.

[21] Appl. No.: 08/904,990

[22] Filed: Aug. 1, 1997

[51] Int. Cl.⁷ ........................................ H04K 1/00
[52] U.S. Cl. .................. 380/255; 380/257; 380/270
[58] Field of Search ...................... 455/410, 411, 455/426, 462, 561, 422, 403; 380/25.49, 270, 272, 257, 255; 713/200, 201, 202

[56] References Cited

U.S. PATENT DOCUMENTS

| | | | |
|---|---|---|---|
| 4,710,955 | 12/1987 | Kauffman | 380/10 |
| 4,972,479 | 11/1990 | Tobias et al. | 380/33 |
| 5,029,207 | 7/1991 | Gammie | 380/10 |
| 5,134,644 | 7/1992 | Garton et al. | 379/39 |
| 5,455,861 | 10/1995 | Faucher et al. | 380/9 |
| 5,524,072 | 6/1996 | Labaton et al. | 380/24 |
| 5,533,127 | 7/1996 | Luther | 380/28 |
| 5,564,077 | 10/1996 | Obayashi et al. | 455/89 |

*Primary Examiner*—Gail O. Hayes
*Assistant Examiner*—Ho S. Song
*Attorney, Agent, or Firm*—Gregory J. Gorrie

[57] ABSTRACT

A communication apparatus (100) provides an interface between a cellular encryption and decryption apparatus (150) and a telephone line (91) allowing for communication of secure data of the telephone line using a regular telephone (70). The communication apparatus (100) provides for the receipt of incoming secure data in an unattended data mode, and also allows the telephone to be used in either a secure mode or clear mode. The communication apparatus monitors the telephone line (91) for secure tones while operating in the clear mode. When a secure tone is detected, the communication apparatus (100) breaks the path between the PSTN (90) and the telephone (70) and routes the signals to the cellular encryption and decryption apparatus (150) to establish a secure call.

10 Claims, 2 Drawing Sheets

METHOD AND APPARATUS FOR COMMUNICATING SECURE DATA OVER A TELEPHONE LINE USING A CELLULAR ENCRYPTION APPARATUS

FIELD OF THE INVENTION

This invention relates in general to the field of secure communications, in particular to the communication of encrypted signals over a telephone line.

BACKGROUND OF THE INVENTION

There is an increasing need to communicate confidential information over the airwaves and telephone lines. The need to secure data from unauthorized access is readily apparent. The use of telephones that communicate over telephone lines is generally considered more secure than cellular and wireless telephones because a court order or physical access to equipment is required to "tap" a telephone line. Wireless communications, on the other hand, can be intercepted with readily available commercial receivers.

Devices for securing cellular telephone calls are becoming readily available. These devices include cellular encryption and decryption devices that interface with a cellular telephone. However, no provisions are made to allow the security features of these devices to be used over the telephone lines.

Thus, what is needed are a method and apparatus that provides an interface between a security device for a cellular telephone, and a telephone line allowing for the use of the security features over the telephone line.

SUMMARY OF THE INVENTION

The present invention provides, among other things, a method for communicating secured data over a telephone line using a cellular encryption apparatus. The method comprising the steps of sensing a loop current on the telephone line, providing a visible indication that non-secure communication is taking place in response to the sensing step, notifying the cellular encryption apparatus to enter a secure communication mode in response to either an input from a user or in response to a secure tone received over the telephone line, coupling the cellular encryption apparatus in series with the telephone line providing loop current to the telephone line, receiving a notification from the cellular encryption apparatus that the cellular encryption apparatus is ready for secure information and providing an indication that secure communication is taking place in response to the step of receiving the notification. The steps of sensing, notifying, coupling, providing loop current and receiving, are performed by a communication device coupled in line with the telephone line and a telephone set. The communication device interfaces with the cellular encryption apparatus and the telephone line is decoupled from the telephone set in response to the receiving the notification step.

The present invention also provides, among other things, a communication apparatus for interfacing a cellular encryption and decryption apparatus between a telephone set and a telephone line. The communication apparatus includes a controller, a loop current sensor for sensing a loop current on the telephone line, and providing a signal to the controller when the loop current is sensed, a first indicator, coupled to the controller, for providing a visible indication that non-secure communication is taking place, a switch for coupling the telephone line with the cellular encryption apparatus, a loop current control circuitry for providing loop current to the telephone line, and a second indicator for providing an indication that secure communication is taking place. The controller notifies the cellular encryption apparatus to enter a secure communication mode, and receives notification from the cellular encryption apparatus that the cellular encryption apparatus is ready for secure information, and the switch decouples the telephone line from the telephone set in response to receipt the notification from the cellular encryption apparatus.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

In the preferred embodiments, the present invention provides a method and a communication apparatus. The communication apparatus provides an interface between a cellular encryption and decryption apparatus and telephone line allowing for communication of secure data on the telephone line using a regular telephone. The communication apparatus provides for the receipt of incoming secure data in an unattended data mode, and also allows the telephone to be used in either a secure mode or clear mode. The communication apparatus monitors the telephone line for secure tones while operating in the clear mode. When a secure tone is detected, the communication apparatus breaks the path between the PSTN and the telephone and routes the signals to the cellular encryption and decryption apparatus to establish a secure call.

Figure 1:
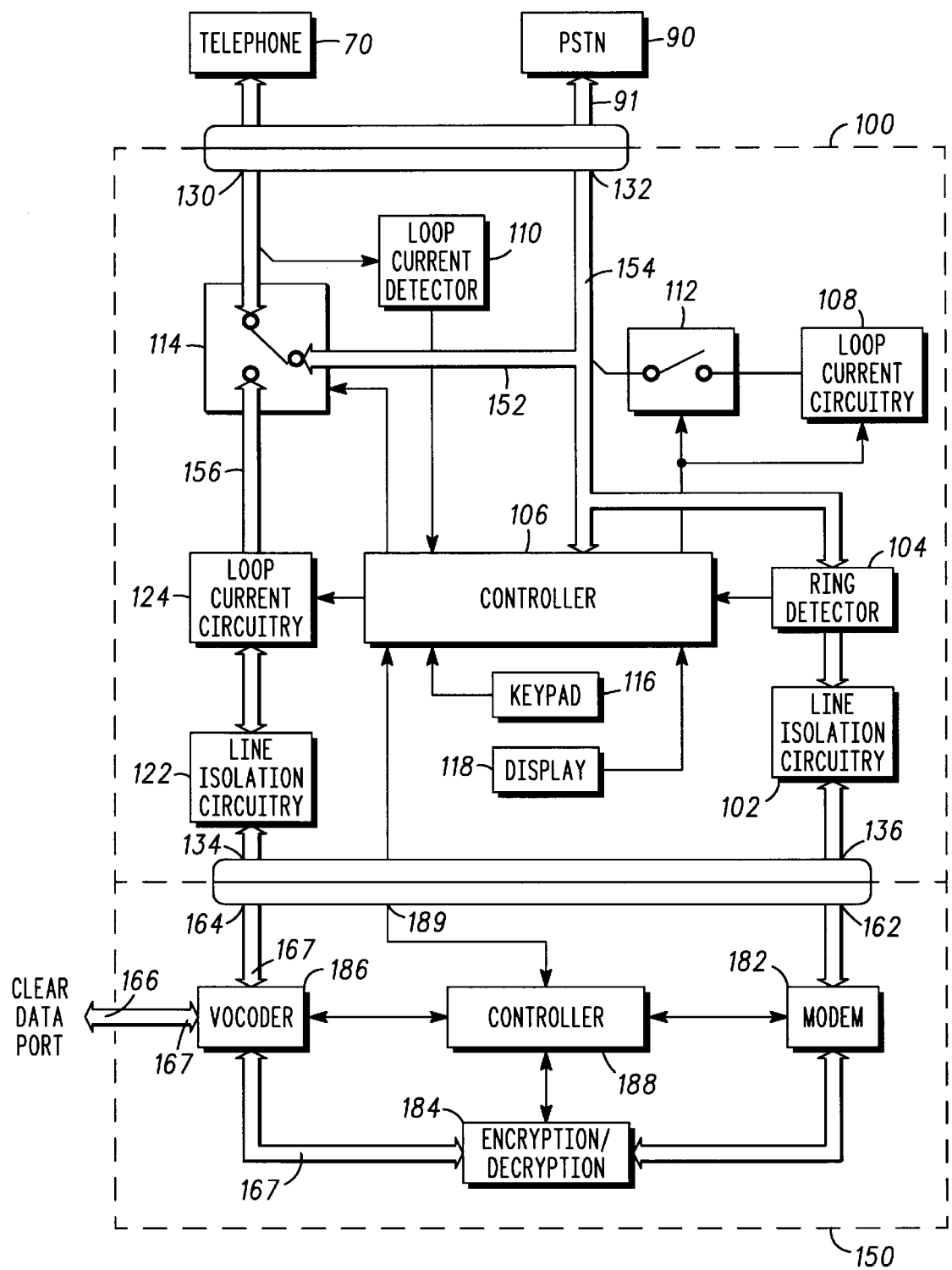
FIG. 1 illustrates a block diagram of a communication apparatus in accordance with a preferred embodiment of the present invention.

FIG. 1 illustrates a block diagram of a communication apparatus in accordance with a preferred embodiment of the present invention. Preferably communication apparatus 100 as shown in FIG. 1 is coupled to cellular device 150 and is also coupled in series with a telephone set 70 and the PSTN 90 as shown. Cellular device 150 is suitable for providing secure communications for a cellular telephone, included, for example, both encryption and decryption of information. Among other things, communication apparatus 100 functions as an interface between cellular device 150 and telephone line 91.

In the preferred embodiment, communication apparatus 100 operates in two modes: a clear mode and a secure mode. In the clear mode, signaling passes from PSTN 90 through apparatus 100 to telephone set 70. In this clear mode communication apparatus 100 monitors the telephone line for secured tones. When a secure tone is detected or a secure button on keypad 116 is pressed, the unit breaks the path between the PSTN and the telephone set and routes the signals to the cellular device 150. A secure call may then be established.

Communication apparatus 100 includes port 132 for interfacing with telephone line 91, which couples to PSTN 90. Port 132 couples through bypass line 152 through relay 114 to port 130. Port 130 interfaces to a telephone unit, for example. Port 132 also couples telephone line 91 through line 154 to ring detector 104. Ring detector 104 includes circuitry for detecting rings on line 154 and providing a signal to controller 106 indicating the presence of such rings. Line 154 couples through ring detector 104 to line isolation circuitry 102 which isolates certain signals on line 154 from port 136. Port 136 is the secure information port of communication apparatus 100.

Relay 112 couples line 154 to loop current control circuitry 108. Loop current control circuitry 108 provides loop current to PSTN 90 when signaled do so by controller 106. Loop current control circuitry 108, among other things, keeps the line to PSTN 90 active when bypass line 152 is opened by relay 114. Communication apparatus 100 also includes keypad 116 for providing user input to controller 106. In the preferred embodiment, keypad 116 has a secure button, a clear button and a data button. Pressing these buttons signals controller 106 to perform certain operations discussed in more detail below. Communication apparatus 100 also includes a display 118. In the preferred embodiment, this display is comprised of three indicators, such as light emitting diodes, that indicate whether or not communication apparatus 100 is in the secure data mode, a secure voice mode or a clear voice or data mode. Display 118 may alternatively provide similar information by other means.

Communication apparatus 100 also includes a loop current detector 110 for detecting when telephone set 70 is off-hook. Relay 114 switches port 130 to either bypass line 152 or line 156. Relay 114 is controlled by controller 106. Loop current detector 110, upon sensing loop current, sends a signal to controller 106. Communication apparatus 100 also includes loop current control circuitry 124 for performing loop current control functions for telephone set 70. Line isolation circuitry 122 provides isolation between ports 134 which is the clear voice port and telephone set port 130. A suitable procedure performed by communication apparatus 100 is described below.

Cellular device 150 includes modem 182 coupled with encrypted data/voice port 162 and encryptor/decryptor 184. Vocoder 186 couples to encryptor/decryptor 184, to clear voice port 164 and to clear data port 166 using data lines 167. Controller 188 interfaces with modem 182, encryptor/decryptor 184, vocoder 186 and control port 189.

Figure 2:
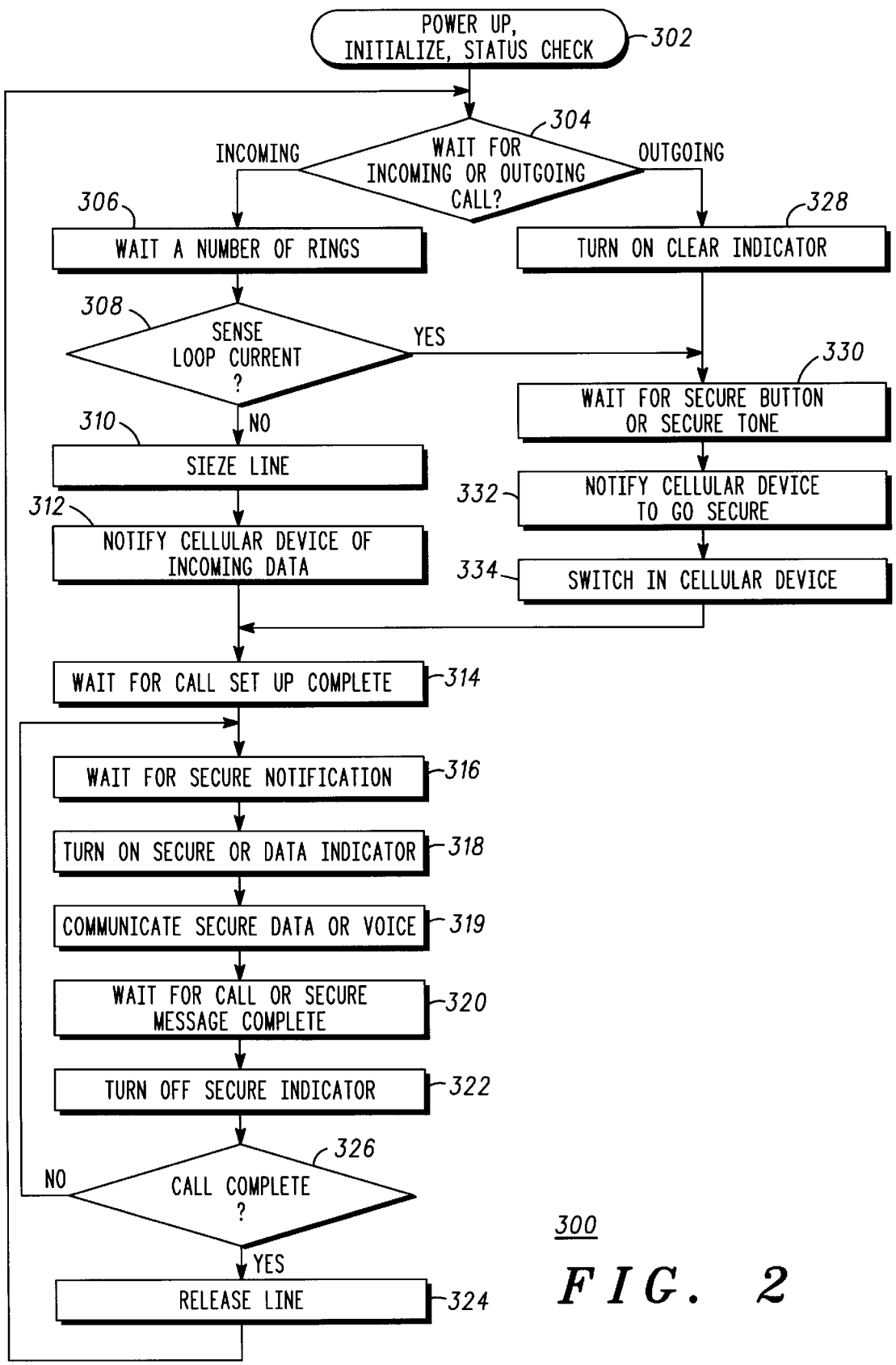
FIG. 2 is a flowchart illustrating a process by a communication apparatus in accordance with the preferred embodiment of the present invention.

FIG. 2 is a flowchart illustrating a process by a communication apparatus in accordance with the preferred embodiment of the present invention. Procedure 300 is preferably performed by a communication apparatus similar to that of communication apparatus 100 (FIG. 1). Those of skill in the art will understand that other suitable communication apparatuses may also perform procedure 300. Among other things, procedure 300 is used for communicating encrypted data over a telephone line using a cellular encryption apparatus. Procedure 300, in the preferred embodiment, is a procedure for interfacing a cellular encryption apparatus between a land line telephone and a telephone line coupled to the PSTN.

Procedure 300 is also suitable for receiving encrypted data over a telephone line using a cellular decryption apparatus. This is referred to as the unattended data mode.

In task 302, the communication apparatus performs steps such as power-up initialization and status check. Task 302 is typically performed in response to a turn on initiated by a user. However, task 302 may be performed in response to signals received over the telephone line from the PSTN. In task 304, the communication apparatus waits for an incoming call over the telephone line. Also, in task 304, the communication apparatus waits for notice of an outgoing call which may be placed by a user of telephone set 70 (FIG. 1). For example, an incoming call may be sensed by ring detector circuitry which detects a ring signal on the telephone line and notifies a controller. An outgoing call may be sensed by a detection of loop current when a telephone is lifted off the hook. Alternatively, if outgoing data is being sent, a modem for example, provides a signal to the communication apparatus which is similar to a telephone on-hook signal.

When the controller is notified by the ring detector that a call is incoming, task 306 is performed. In task 306, the controller counts the number of rings and after a predetermined number of rings, the controller may determine to answer the incoming call. If prior to the predetermined number of rings, loop current is sensed in the telephone line by the loop current detector, task 308 determines that the call is being answered by a user. For example, telephone set 70 may be lifted off the hook in response to the incoming ring.

When after a predetermined number of rings the phone is not answered, task 310 is performed. At this point in procedure 300, the communication apparatus is planning on receiving secure data over the phone line in the unattended data mode. In task 310, the phone line is seized. Relay 112 is closed while relay 114 disconnects the telephone set from bypass line 152 (FIG. 1). Preferably in task 310, the controller verifies that the receive data button has been pressed on the communication apparatus. Task 310 also involves providing loop current control to the PSTN through loop current control circuitry. Task 310 may be viewed as an auto-answering task.

In task 312, communication apparatus notifies the cellular device 150 (FIG. 1) that secure data will be coming over the telephone line. Task 312 may include the task of controller 106 sending a "go secure" message to the cellular device. Task 312 may also involve waiting for a receipt of a signal over the phone line that tells the controller that secure data is coming.

After the communication apparatus notifies the cellular encryption device that secure data is coming task 314 is performed. In task 314, the communication apparatus waits for a notice that call setup is complete. This notice preferably comes from the cellular device. Once call setup is complete, the clear (non-secure) information indicator is preferably turned on indicating that information received over the telephone line is not ready to be decrypted. In task 316 communication apparatus waits for a notification from the cellular device that it is ready to decrypt the incoming data. While waiting in task 316, cellular device performs tasks typical in the art for the decryption of information. Once task 316 is complete, cellular device 150 is ready to receive encrypted data and ready to receive and decrypt such data.

In task 318, the secure data light is turned on and the clear data indicator is turned off. In task 319 the secure data is received through the communication apparatus and provides it to the cellular encryption device through port 136 (FIG. 1). During the performance of task 319 cellular device 150 among other things decrypts the encrypted data an provides the decrypted data to a clear data port, for example port 166 (FIG. 1).

In task 320, communication apparatus waits for a message that says that the secure data transmission is complete or alternatively, it may sense that the clear button has been pressed on keypad 116. The secure information complete message may be provided by the cellular device 150 or it may be received over the phone line from PSTN 90. In the unattended data mode, it is assumed that in this point in procedure 300 the call is complete and task 324 is performed which releases the phone line. Task 324 involves recoupling bypass line 152 to telephone set 70 with relay 114 and also includes opening relay 112 no longer providing loop current to PSTN 90. Task 324 may be viewed as hanging up the line. After task 324 is complete communication apparatus returns to task 304 and waits for an incoming or outgoing call.

In task 308, when loop current from the telephone set is sensed, (e.g., when the telephone is answered by a user) task 330 is performed. Similarly in task 304, loop current detector 110 senses loop current when the telephone set is lifted off hook. In this outgoing call situation task 330 is performed. Prior to task 330, task 328 may turn on the clear information indicator indicating that cellular device 150 is not encrypting and/or decrypting the information. During the performance of task 330, communications are routed between telephone set 70 and PSTN 90 through bypass line 152 (see FIG. 1). Accordingly, the connection of communication apparatus and cellular device 150 to the telephone line is virtually invisible to a user. In task 330, controller 106 waits for the secure button to be pressed via keypad 116. Alternatively, controller 106 waits for a secure notice such as a secure tone, over the phone line from the other end. Alternatively, controller 106 may be notified by the cellular device 150 that it has received a secure tone or secure notice.

In task 332, the communication apparatus responds to the secure button being pressed by notifying the cellular device to go secure. In the preferred embodiment, controller 106 sends a control signal to controller 188. In task 334, the cellular device is switched in line with the telephone line. In task 334, relays 112 and 114 are switched and loop current control circuitry 108 provides loop current to the PSTN. Relay 114 provides a connection from telephone set 70 to loop current control circuitry 124. Accordingly, PSTN and telephone set 70 are now coupled through communication apparatus 100 and through cellular device 150.

After task 334 switches in the cellular device,-task 314 waits for a call setup complete message, preferably from controller 158. When the call setup is complete, task 316 is performed in which the communication apparatus waits for a secure notification from the cellular device indicating that it is ready to decrypt and/or encrypt information. Upon receipt of this notification task 318 is performed which turns on the secure voice or data indicators.

In task 319, secure information is communicated between telephone set 70 and PSTN 90. During task 319, cellular device 150, among other things, encrypts and decrypts information provided from ports 134 and 136 of communication apparatus 100. During task 319, clear voice data, for example, is provided to and from communication apparatus 100 through port 130 to telephone set 70. Encrypted voice or other information is provided to and from PSTN 90 through port 132. Port 134 of communication apparatus 100 provides a clear voice or other information to cellular device 150 while port 136 provides the encrypted voice or other information to cellular device 150. During task 320, communication apparatus 100 waits for the clear data button to be pressed via keypad 116 or waits for a secure message complete notice either over the phone line or from controller 158. A user of telephone set 70 may press the clear button when the user no longer wishes to communicate secure voice over the telephone.

In task 322, the secure indicator is turned off, the clear indicator is turned on and bypass line 152 is coupled into the telephone line through relay 114. Furthermore, relay 112 releases the phone line. If task 326 determines that the call is not complete, the user may wish to continue his non-secure telephone call whereby communications are routed through bypass line 152.

During the performance of task 326, clear voice information is communicated through bypass line 152. In another embodiment, clear non-encrypted information may be routed through cellular device and encryptor/decryptor 184 acts as a through device without performing an encryption or decryption functions.

Upon completion of the call, task 324, detector 110 senses loop current and notifies controller 106 when the user hangs up the telephone. The telephone line is released by opening relay 112 and coupling bypass line 152 to the phone line through relay 114.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for communicating secured information over a telephone line with a communication device coupled between the telephone line and a telephone set, the communication device coupled to a cellular encryption apparatus, the method comprising the steps of:

sensing a loop current on said telephone line;

providing a visible indication that non-secure communication is taking place in response to the sensing step;

notifying said cellular encryption apparatus to enter a secure communication mode in response to a go-secure signal;

decoupling said telephone line directly from the telephone set in response to the notifying step;

coupling said telephone line in series with said cellular encryption apparatus;

providing loop current to said telephone line in response to the coupling step;

receiving a notification from said cellular encryption apparatus that said cellular encryption apparatus is ready for secure information;

providing an indication that secure communication is taking place in response to the step of receiving said notification; and coupling the cellular encryption apparatus with the telephone set in response to the decoupling step when secure voice data is communicated, and when secure non-voice data is communicated, said cellular encryption apparatus providing said secure non-voice data to a clear data port, said telephone line remaining decoupled from said telephone set.

2. A method as claimed in claim 1 wherein the step of notifying is performed in response to an input from a user, the input providing the go-secure signal.

3. A method as claimed in claim 1 wherein the step of notifying is performed in response to said go-secure signal received over said telephone line.

4. A method for communicating secured data over a telephone line using a cellular encryption apparatus, the method comprising the steps of:

sensing a loop current on said telephone line;

providing a visible indication that non-secure communication is taking place in response to the sensing step;

notifying said cellular encryption apparatus to enter a secure communication mode in response to either an input from a user or in response to a secure tone received over said telephone line;

coupling said cellular encryption apparatus in series with the telephone line;

providing loop current to said telephone line;

receiving a notification from said cellular encryption apparatus that said cellular encryption apparatus is ready for secure information; and providing an indication that secure communication is taking place in response to the step of receiving said notification, wherein the steps of sensing, notifying, coupling, providing loop current and receiving, are performed by a communication device coupled in line with said telephone line and a telephone set, the communication device interfacing with said cellular encryption apparatus, the method further comprising the step of decoupling said telephone line from said telephone set in response to the receiving said notification step.

5. A method as claimed in claim 4 wherein a notification to end secure communication is received from a user input on said communication device.

6. A method as claimed in claim 4 wherein a notification to end secure communication is received over said telephone line.

7. A method as claimed in claim 6 further comprising the steps of:

sending a message to said cellular encryption apparatus to end secure communication in response to said notification to end secure communication;

turning off said indication that secure communication is taking place; and coupling said telephone line directly with said telephone set for communication of non-secure information.

8. A method for receiving encrypted data over a telephone line using a cellular decryption apparatus, the method comprising the steps of:

coupling said telephone line to said cellular decryption apparatus in response to a ring voltage on said telephone line;

providing loop current to said telephone line;

notifying said cellular decryption apparatus to receive said encrypted data;

receiving a notification of completion of a secure call set-up procedure by said cellular decryption apparatus;

providing an indication that secure communication is taking place in response to said notification;

transferring said encrypted data to said cellular decryption apparatus in response to said notification;

receiving a call complete message from said cellular decryption apparatus; and decoupling said telephone line from said cellular decryption apparatus in response to said call complete message, and wherein the steps of providing loop current, notifying, receiving, providing said indication, transferring, receiving, and decoupling are performed by a communication device coupled in line with said telephone line and a telephone set, the communication device interfacing with said cellular decryption apparatus, the method further comprising the steps of:

decoupling said telephone line from said telephone set in response to said ring voltage; and recoupling said telephone line with said telephone set in response to said call complete message.

9. A communication apparatus for interfacing a cellular encryption and decryption apparatus between a telephone set and a telephone line comprising:

a controller;

a loop current sensor for sensing a loop current on said telephone line, and providing a signal to said controller when said loop current is sensed;

a first indicator, coupled to the controller, for providing a visible indication that non-secure communication is taking place;

a switch for coupling said telephone line with said cellular encryption apparatus;

loop current control circuitry for providing loop current to said telephone line; and a second indicator for providing an indication that secure communication is taking place, wherein the controller notifies said cellular encryption apparatus to enter a secure communication mode, and receives notification from said cellular encryption apparatus that said cellular encryption apparatus is ready for secure information, and wherein said switch decouples said telephone line from said telephone set in response to receipt the notification from the cellular encryption apparatus.

10. A communication apparatus for receiving encrypted data over a telephone line using a cellular decryption apparatus, the communication apparatus comprising:

a switch for coupling said telephone line to said cellular decryption apparatus in response to a ring voltage on said telephone line;

a loop current provider for providing loop current to said telephone line;

a controller for notifying said cellular decryption apparatus to receive said encrypted data, and for receiving a notification of completion of a secure call set-up procedure by said cellular decryption apparatus;

an indicator for providing an indication that secure communication is taking place in response to said notification; and means for transferring said encrypted data to said cellular decryption apparatus in response to said notification, and wherein the controller causes the switch to decouple a telephone set from the telephone line in response to the notification.

* * * * *